Figure 1:
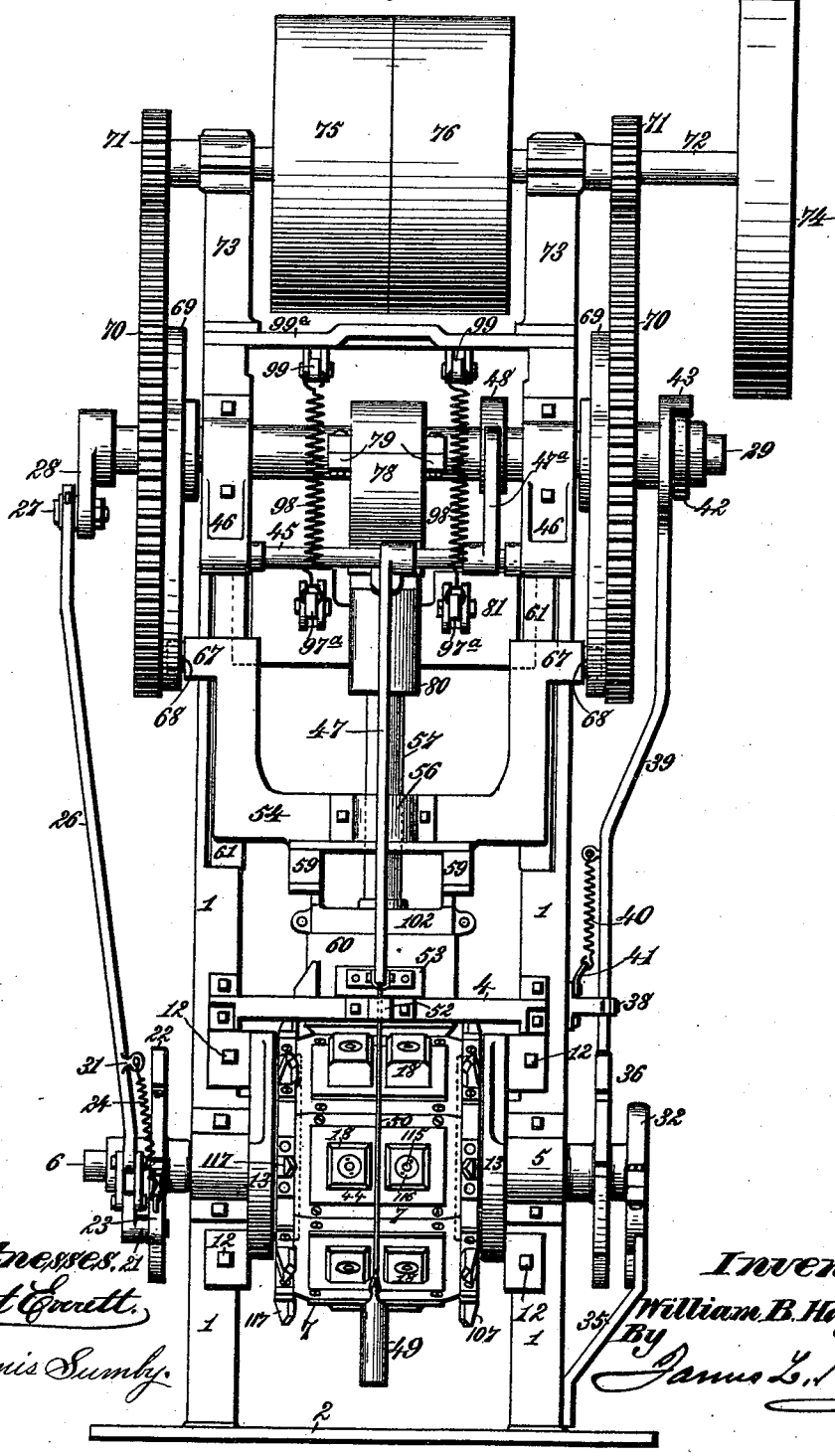

(No Model.) 7 Sheets—Sheet 1.

W. B. HAYDEN.
MACHINE FOR MOLDING BLOCKS OR BRICKS.

No. 436,237. Patented Sept. 9, 1890.

Witnesses:
Robert Everett
Dennis Sumby

Inventor
William B. Hayden
By James L. Norris
Atty.

(No Model.) 7 Sheets—Sheet 2.

W. B. HAYDEN.
MACHINE FOR MOLDING BLOCKS OR BRICKS.

No. 436,237. Patented Sept. 9, 1890.

Witnesses,
Robt Emett.
Dennis Sumby.

Inventor:
William B. Hayden,
By
James L. Norris
Atty (No Model.) 7 Sheets—Sheet 3.
W. B. HAYDEN.
MACHINE FOR MOLDING BLOCKS OR BRICKS.
No. 436,237. Patented Sept. 9, 1890.
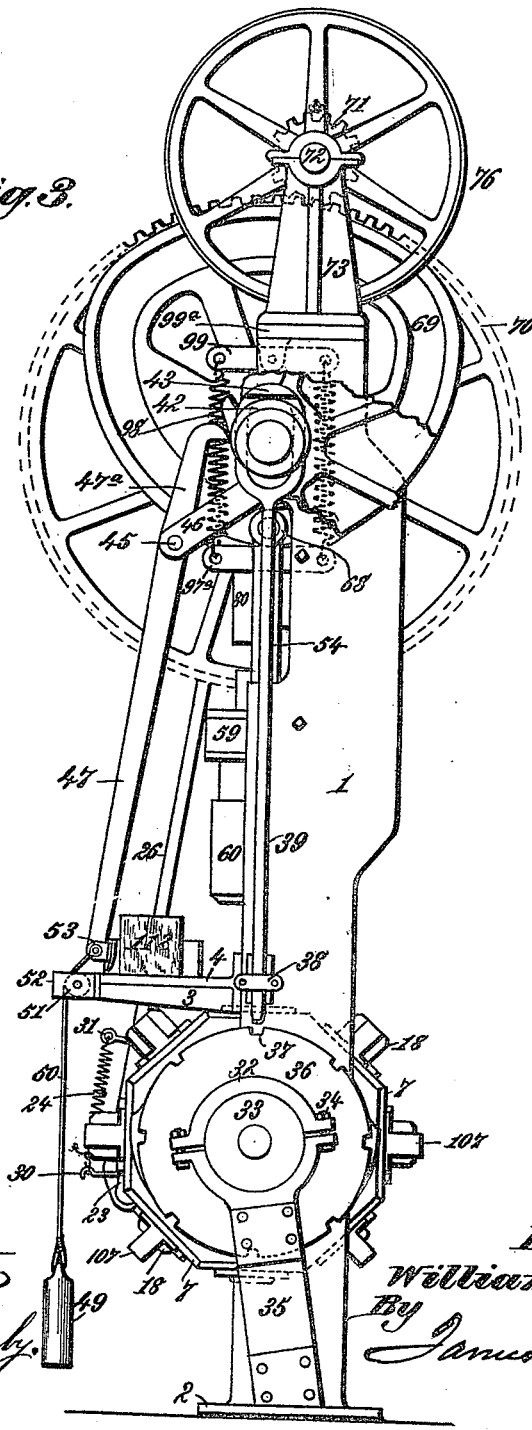

(No Model.)
7 Sheets—Sheet 4.
W. B. HAYDEN.
MACHINE FOR MOLDING BLOCKS OR BRICKS.
No. 436,237.
Patented Sept. 9, 1890.
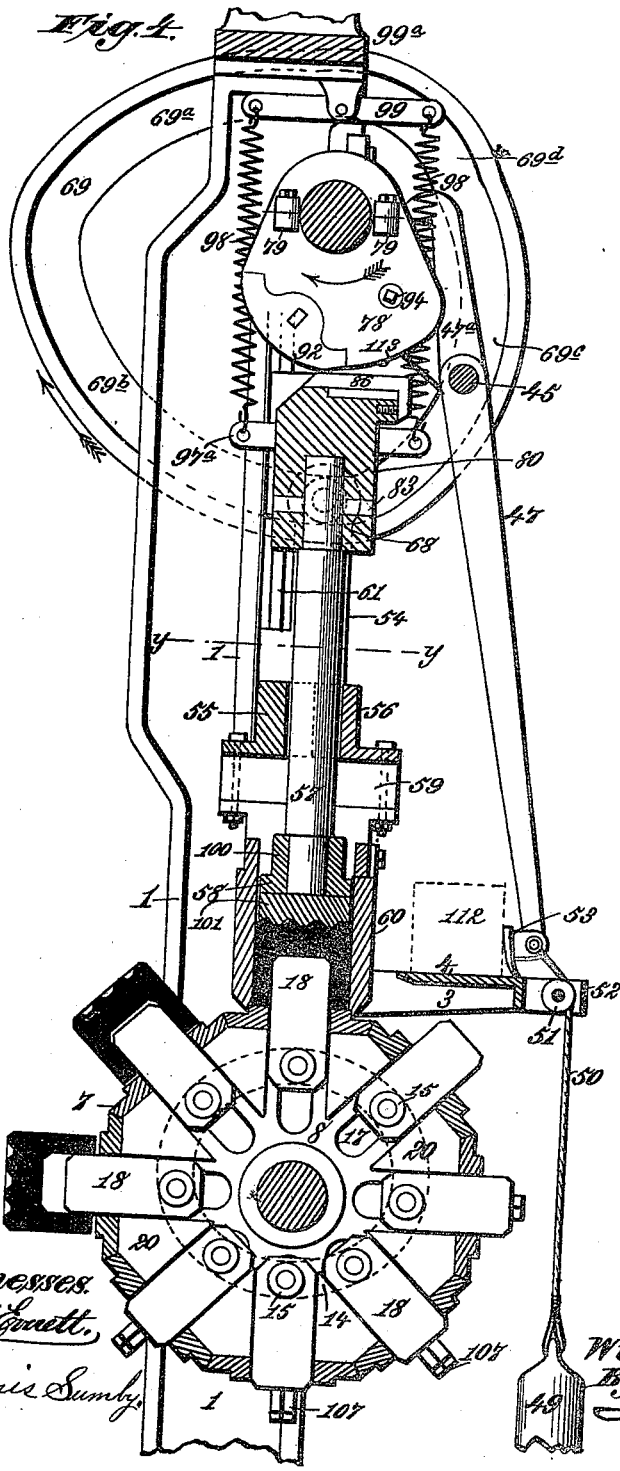
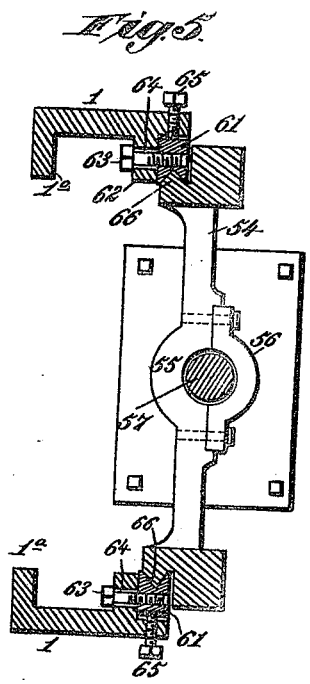
Witnesses.
Inventor.
William B. Hayden.
By James L. Norris.
Atty.

(No Model.) 7 Sheets—Sheet 5.
W. B. HAYDEN.
MACHINE FOR MOLDING BLOCKS OR BRICKS.
No. 436,237. Patented Sept. 9, 1890.
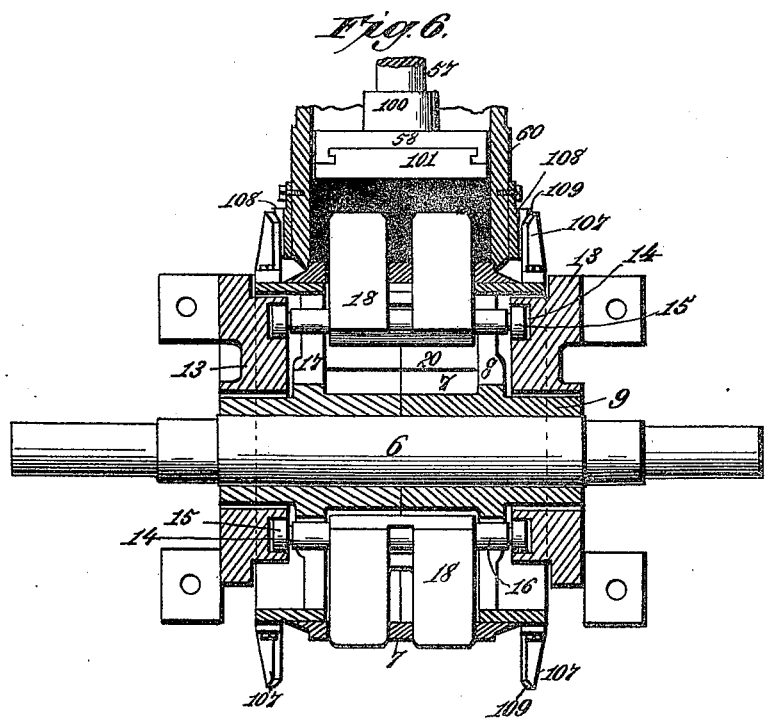
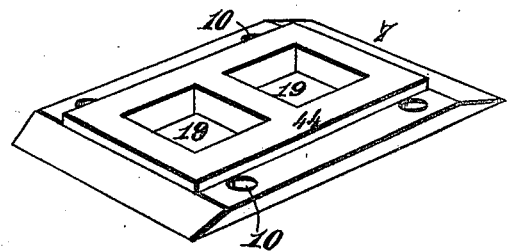
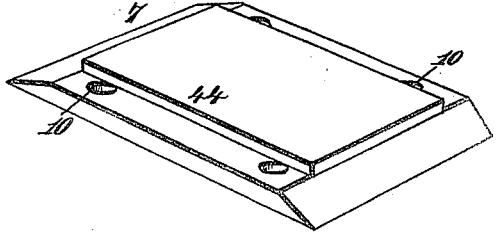
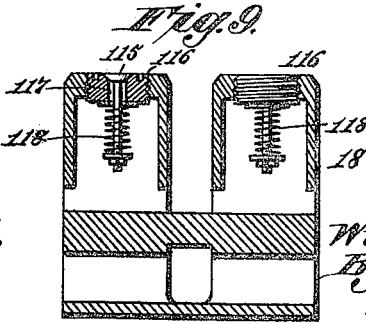
Witnesses.
Robert Everett.
Dennis Sumby.
Inventor.
William B. Hayden.
By James L. Norris.
Atty.

(No Model.) 7 Sheets—Sheet 6.
W. B. HAYDEN.
MACHINE FOR MOLDING BLOCKS OR BRICKS.
No. 436,237. Patented Sept. 9, 1890.
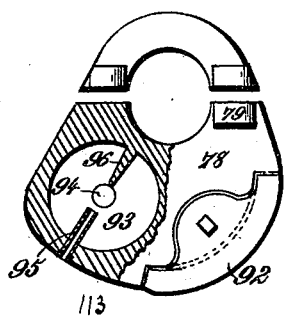
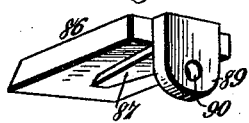
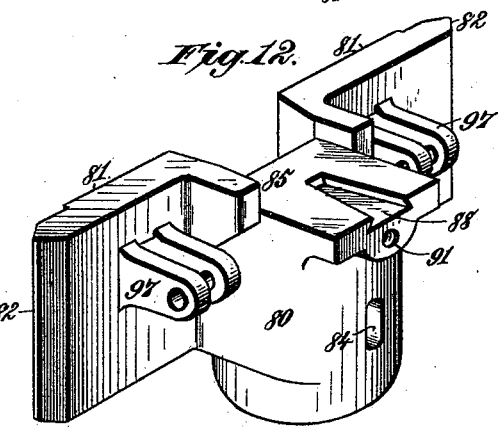
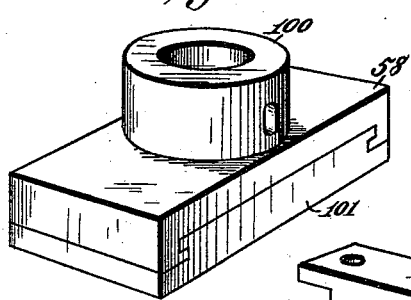
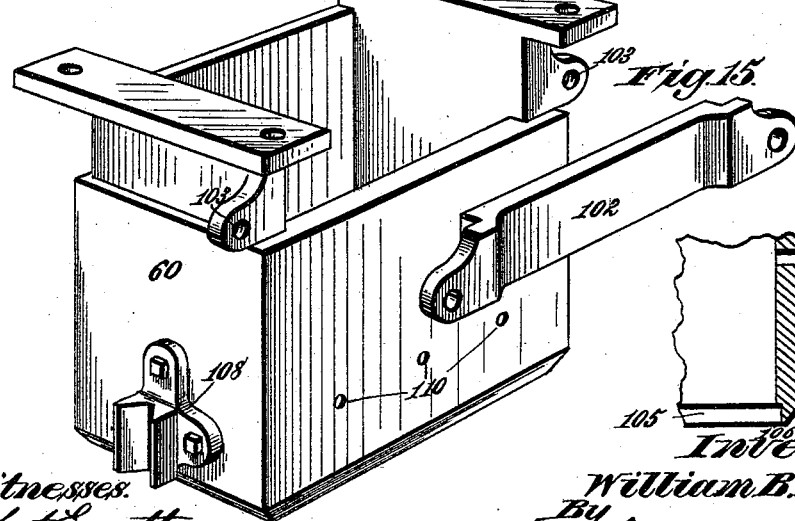
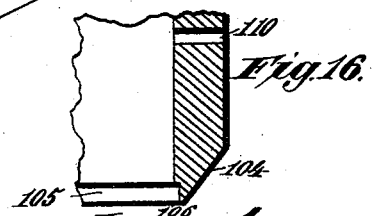
Witnesses.
Robt Emitt
Dennis Sumby
Inventor:
William B. Hayden,
By James L. Norris
Atty.

(No Model.) 7 Sheets—Sheet 7.
W. B. HAYDEN.
MACHINE FOR MOLDING BLOCKS OR BRICKS.
No. 436,237. Patented Sept. 9, 1890.
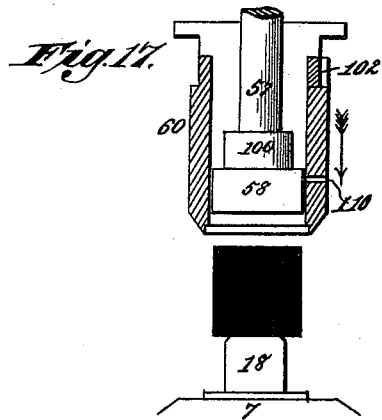
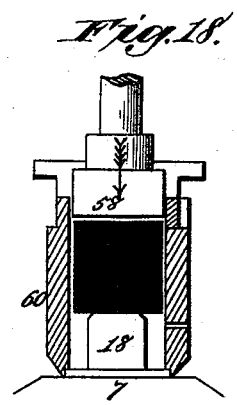
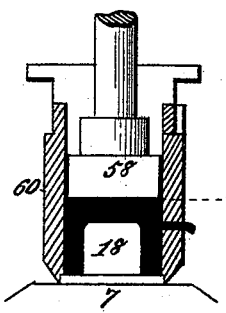
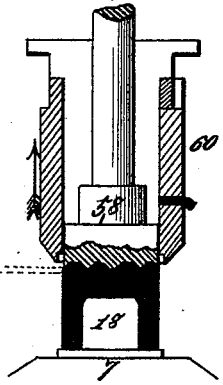
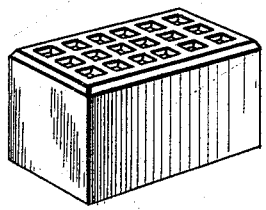
Witnesses.
Robt. Everitt.
Dennis Sumby.
Inventor:
William B. Hayden.
By James L. Norris.
Atty.

UNITED STATES PATENT OFFICE.

WILLIAM B. HAYDEN, OF COLUMBUS, OHIO.

MACHINE FOR MOLDING BLOCKS OR BRICKS.

SPECIFICATION forming part of Letters Patent No. 436,237, dated September 9, 1890.

Application filed May 24, 1890. Serial No. 353,059. (No model.)

*To all whom it may concern:*

Be it known that I, WILLIAM B. HAYDEN, a citizen of the United States, residing at Columbus, in the county of Franklin and State of Ohio, have invented new and useful Improvements in Machines for Pressing and Molding Substances into Blocks, of which the following is a specification.

My invention relates to the manufacture of paving-blocks, building-blocks, and other similar material, and one purpose thereof is to provide automatic means whereby a formed mass of plastic material—such as clay—may be fed to the mold or core-box, and whereby the latter may be raised to receive the clay and dropped to engage and form a close joint with the platen or bed on which the block is formed.

It is my further purpose to combine with the automatic feeding devices a rotating series of core-blocks reciprocating through a polygonally-arranged series of platens and rising successively in front of the feed-table to receive the formed masses of clay upon their ends, the clay being sustained by the feeding device until the core-pieces reach a vertical position, or substantially so, and to provide means for arresting and locking said platen-cylinder and dropping the mold or core-box thereon to surround the clay or plastic material and form a close joint with the platen while the material is being compressed.

It is my further purpose to combine with a series of polygonally-arranged platens mounted on a rotary axis a corresponding series of single or duplex core-blocks, which are successively projected through openings in said platens and then gradually retracted upon the further and intermittent movement of the platens to withdraw the core-blocks from the molded mass, means being also provided whereby this withdrawal may be effected without creating a vacuum within the recess formed by the core-pieces.

My invention also comprises means whereby a substantially equal compression may be applied to each plastic mass, and whereby, also, the uniform shape of the molded block shall be preserved after the compressing force is removed, the plunger lifted, and the core-box or mold raised and removed from the compressed block.

It is my purpose, finally, to provide novel means whereby the plunger or core-box may be operated in proper relation one to the other, whereby the face-plate of the plunger may be removed and one of a different pattern substituted without removing the parts of the mechanism, and whereby, also, the platens may be rendered interchangeable and the core-pieces removed to enable the machine to produce solid blocks in place of cored blocks.

My invention also comprises certain novel details of construction and new combinations of parts, all of which are fully set forth hereinafter, and then definitely pointed out in the claims which follow this specification.

To enable others skilled in the art to practice my said invention, I will proceed to describe the same in detail, reference being had to the accompanying drawings, in which—

Figure 2:
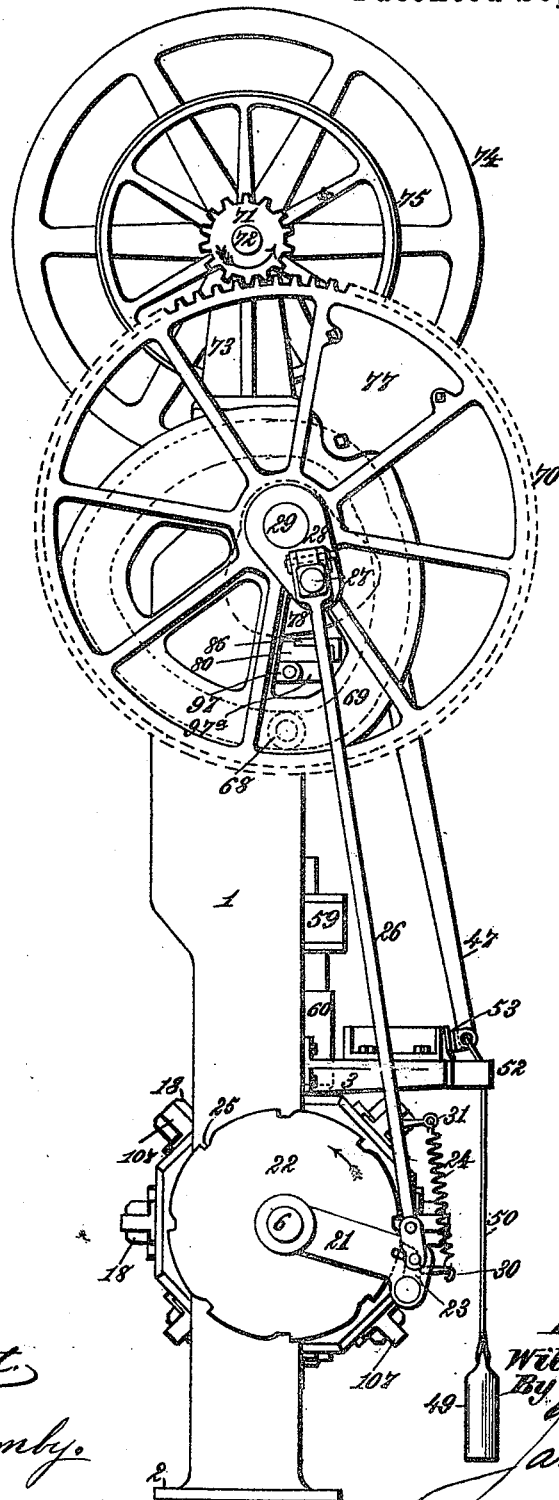

Figure 1 is a front elevation of the complete machine. Fig. 2 is a side elevation of the same. Fig. 3 is a similar elevation taken from the opposite side of the machine. Fig. 4 is a vertical section, enlarged, of the parts shown in Fig. 1 below the power-shaft. Fig. 5 is a horizontal section on the line $y$ $y$, Fig. 4. Fig. 6 is a vertical section of the platen-cylinder and its adjuncts, taken upon the axial line of said cylinder. Fig. 7 is a detail perspective of a platen used in the formation of core-blocks. Fig. 8 is a similar view of a platen used in the formation of solid blocks. Fig. 9 is a detail section of one pair of core-pieces or core-blocks. Fig. 10 is a sectional elevation of the cam operating the plunger. Fig. 11 is a detail perspective of the removable wear-plate upon which the cam shown in Fig. 10 acts. Fig. 12 is a similar view of the traveling head carrying the plunger-shaft and the wings or guides mounted or formed on said head for insuring true rectilinear movement. Fig. 13 is a perspective view of the plunger-head, showing the manner of connecting the interchangeable face plate. Fig. 14 is a perspective view of the core-box or mold, showing the construction by which the face-plate of the plunger is rendered removable and interchangeable without dismantling the machine. Fig. 15 is a detail perspective of the removable wall-section taken from or bolted to the core-box or mold to permit the removal of the face-plate and the substitution of one of a different pattern. Fig 16 is a detail section of a part of the side wall of the core-box or mold. Fig. 17 is a detail section showing the block of plastic material mounted on the ends of the core-pieces, the core-box or mold being about to descend and inclose the same. Fig. 18 is a similar view showing the core-box or mold descended and the plunger about to follow. Fig. 19 is a similar section showing the plunger in elevation, the latter being upon the point of rising slightly to permit the core-box or mold to lift. Fig. 20 is a similar view showing the plunger partly in section and indicating the degree to which said plunger lifts and the point at which it is held to permit the rise of the core-box or mold, the latter being shown as raised completely off the formed block. Fig. 21 is a detail perspective showing the finished article.

In the said drawings, the reference-numeral 1 denotes the upright standards of the machine-frame, which are mounted on any suitable base 2. Bolted upon these standards are arms 3, (shown in Figs. 1, 2, 3, and 4,) which support a feed-table 4, arranged in substantially a horizontal plane. Journaled in suitable bearings 5, Fig. 1, arranged below the arms or brackets 3, is a horizontal shaft 6, upon which is mounted a platen-cylinder 7, formed of any number of platens of the kind shown in Fig. 7, the said plates being flat upon their outer faces and beveled upon their meeting edges to form close joints. Upon their ends the platens are beveled off to an edge, although this is not absolutely essential. These plates are mounted upon spiders or frames 8, carried by a sleeve 9, rigid on the shaft 6, openings 10 being formed to admit the screws or bolts I will employ in order to attach the platens to the frames or spiders 8.

Surrounding the shaft 6 and rigidly attached to the standard 1, as shown in Fig. 1, by means of bolts 12, are frames 13, arranged eccentrically to the shaft 6, and having on their inner faces circular raceways 14, in which ride friction-rolls 15, mounted upon the journals of shafts or bars 16, which move in channels 17, radial to the shaft 6. Upon each of these shafts or bars I arrange one or more core-pieces 18, which project through and lie in openings 19 in the platens 7, Figs. 4, 6, and 7. Between the adjacent and radially-arranged core-pieces are arranged angular guides 20, rigid with the spiders 8 and forming part of the same. The screws or bolts attaching the platens enter the beveled ends of these guide-blocks. It will be seen that as the cylinder revolves the core-pieces 18 will be successively projected through the openings in the platens and then slowly withdrawn, as shown more fully in Fig. 4.

The platen-cylinder 7 receives an intermittent revolution by means of a pawl-carrying arm 21, loosely mounted upon one end of the shaft 6, Fig. 2, and provided upon its end, which projects beyond the periphery of a notched disk 22, (rigidly mounted on the shaft 6,) with a pawl 23, pivoted on the end of the arm, and thrown by a spring 24 into the notches 25 of the disk. The end of the arm 21 is linked to the end of the pitman 26, which is mounted at its other end on a wrist 27, carried by a crank-arm 28, which is operated by a shaft 29 in a manner presently to be described, the spring 24 being connected at one end to a hook 30 on the back of the pawl and at the other to a small bracket 31 on the pitman.

In order to prevent the throw of the pawl from carrying the heavy platen-cylinder too far by the momentum imparted, a friction-brake is applied to one end of the shaft 6, consisting of an adjustable two-part bearing 32, Fig. 3, which may be tightened upon the shaft or upon a disk 33, rigid thereon, by means of bolts 34. This bearing is carried by a bracket 35, bolted to one of the standards of the machine.

Upon each partial revolution of the platen-cylinder it is necessary that it be positively locked in place, and this is effected by the following means: Upon the shaft 6 is rigidly mounted a locking-disk 36, having at proper intervals notches 37. Arranged in a keeper or guide 38, projected from the side of the standard 1, is a rising and falling locking-bar 39, thrown downward by a spring 40, connected to a hook 41 on the guide 38 and to an eye on the bar 39. This bar is lifted out of the notches 37 in the locking-disk by means of a cam 42, carried by the outwardly-projecting end of the shaft 29 and engaging an offset 43 on the forked end of the locking-bar, the cam passing off the same at any suitable instant to enable the bar to engage the notches 37 in the locking device 36.

Upon each of the platens 7, which compose the platen-cylinder, upon their outer flat faces, are forming-platforms 44, which may or may not be penetrated by openings 19 for the core-blocks. These forming-platforms are raised slightly above the faces of the platens, as shown in Figs. 7 and 8, their shape being preferably rectangular and of any relative length and width.

Upon the shaft 45, mounted in suitable hangers 46 on the standards of the machine, is mounted a feed-lever 47, said shaft having an arm 47$^a$, rising above the fulcrum-point of the feed-lever, and being operated at intervals by a cam 48 upon the shaft 29, whereby the lower end is swept over the feed-table 4. After each inward movement the feed-lever is drawn outward by a weight 49, attached to a cord 50, running over a pulley 51, journaled in a bracket 52 on the outer edge of the feed-table. Upon the lower end of this feed-lever is pivotally mounted a push-plate 53, the purpose of which will be explained hereinafter.

Upon a yoke-frame 54, Figs. 1, 4, and 5, is mounted a head 55, having a detachable half-bearing 56, which incloses, in conjunction with an engaging half-bearing, the plunger-rod 57 of a plunger 58. Beneath this yoke is centrally arranged and fastened a filling-piece 59, upon which is rigidly mounted a core-box or mold 60. (Shown in Fig. 14.)

Upon the vertical standards 1, which, as shown in Fig. 5, are provided with angular portions 1ª for strength, are mounted vertical guides 61, attached to ribs 62 by means of screws 63, which have limited horizontal play in slots 64, formed in said ribs, whereby they may be from time to time set up, one toward the other, by set-screws 65 to take up wear. Within these guides, which are provided with angular grooves upon their inner faces, are formed or arranged wedge-shaped guides 66, formed upon the vertical arms of the yoke 54 to give true vertical movement to the yoke and to the core-box or mold carried thereby. Upon the vertical arms of the yoke 54, at their upper extremities, are formed outwardly-extending portions 67, upon the extremities whereof are journaled friction-rolls 68, Figs. 1, 2, and 3, which lie in similar cam-races 69, formed upon or carried by the inner faces of gears 70, rigid upon the opposite ends of the shaft 29, said gears being mounted upon those portions of the said shaft 29 which lie outside the vertical standards 1. These gears are driven by intermeshing pinions 71, carried by a power-shaft 72, journaled in brackets 73 upon the upper portions of the vertical standards 1. This power-shaft is provided with a fly-wheel 74 and with a fast and loose pulley 75 and 76 and is driven from any suitable source of power. In order to balance the weight of the cam-races in which the friction-wheels 68 run, which are eccentric to the shaft 29, balancing-weights 77, Fig. 2, are inserted in the gears 70.

Upon the shaft 29 is mounted a cam 78, (shown in detail in Fig. 10,) and having lugs 79, by which it may be engaged with the said shaft by means of bolts. Beneath this cam, which will be more specifically described hereinafter, is a head 80, Fig. 12, having lateral wings 81, provided with angular or wedge-shaped edges 82, which run in continuations of the ways which guide the yoke 54. Within the head 80 is formed a recess or opening which receives the end of the plunger-rod carrying the plunger, which is rigidly locked therein by a key 83, inserted through an opening 84 in the head, as shown in Fig. 12. Upon the upper horizontal surface of this head is formed a seat 85, which receives a wear-plate 86, Fig. 1, having a wedging and dovetailed tenon 87, which engages a mortise 88 in the seat 85. This wear-plate, which is made of hardened steel, is also provided with a hanging lug 89, which has a bolt-opening 90, by which it may be positively connected with an opening 91, tapped into the vertical edge of the seat. The cam 78 is also provided with a wear-plate 92, of hardened steel, Fig. 10, which forms that portion of the cam acting upon the wear-plate 86. Said cam is also provided with an oil-chamber 93, filled through an orifice closed by a central plug 94. Within this chamber lie radial tubes 95, terminating at the periphery of the cam and extending to the center of the chamber 93. Diametrically opposite said tube is a partition-wall 96, pointing toward the open mouth of the tubes 95, whereby at each revolution of the cam some portion of the oil contained shall drip into the tube 95 and flow therethrough upon the wear-plate 86.

Upon the wings 81 are formed lugs 97, in which are pivotally mounted levers 97ª, to which are connected springs 98, attached at their upper ends to like bars 99, pivoted in hangers on the cross-brace 99ª, by means of which the head carrying the piston-rod is lifted after each action of the cam. The plunger-head 100, Fig. 13, is detachably keyed upon the end of the piston-rod and is provided with an interchangeable pattern-plate 101, which may be slid in and out from the plunger-head whenever it is desired to change the pattern of the imprint formed upon the face of the block. To facilitate this interchange without dismantling the machine, I mount upon the upper part of the vertical face of the core-box or mold a removable section 102, Fig. 14, attached by bolts to lugs 103 on the mold. By simply removing this section access may be had to the face-plate, which can readily be withdrawn and a new one with either a plane face or a face of different pattern substituted therefor. The lower edge of the core-box or mold has an exterior bevel 104, Fig. 16, and an interior rabbet 105, by which a sharp or nearly sharp edge 106 is produced, which seats upon the platens 7 immediately around the raised faces or tablets 44, the rabbet 105 resting upon the raised face and making a close joint as long as the connection is maintained, as seen in Fig. 6.

In order to guide the parts into accurate engagement, I form or mount upon the ends of the platens 7 angular guide-brackets 107, which engage grooved wear-brackets 108, detachably mounted on the ends of the core-box and having grooves which engage said guide-brackets and produce an exact register of the parts. These brackets are provided with diverging bevels 109 at their ends to compensate for any slight lateral displacement.

Inasmuch as the mass of plastic material placed in the core-box or mold may be at times slightly in excess of the maximum capacity of that box, the latter is provided with one or more relief-apertures 110, Figs. 14, 17, 18, 19, and 20, to permit the escape of the surplus quantity.

The operation of the parts thus far described is substantially as follows: The clay or other plastic material is first molded, either by hand or otherwise, into a cubical mass 112, approximating the shape and size of the core-box, but slightly smaller, that said box or mold may readily pass over the same. This mass is then placed, either by hand or by any suitable automatic mechanism, upon the feed-platform 4 in front of the pusher 53 upon the end of the feed-bar, which is drawn back by a cord 50 and weight 49, Figs. 3 and 4. The core-box 60 and the plunger 58 being both raised and the platen-cylinder being in motion, the projected ends of one pair of core-pieces 18 (if two are used) arrive beneath the beveled edge of the feed-platform 4 at the instant when the bottom of the plastic mass 112 has been brought by the feed-lever 47 a little beyond the edge of said platform, where it is received upon the inclined faces of the core-pieces. From this point the core-pieces and the plastic mass move in unison, the slight inclination of the latter, due to the rotary movement of the former, being permitted by the pivotal pushing-plate 53 on the feed-lever. As the core-pieces reach a vertical position the cylinder is arrested and locked by the friction-brake 32 33 and locking-bar 39, as already described, the plastic mass being poised upon the ends of the core-pieces in the manner shown in Fig. 17. The core-box or mold 60, which at this point occupies the position relative to the plunger shown in said Fig. 17, now begins to descend, being carried down by the cam-race 69, which is provided, Fig. 4, with a forcing-section $69^a$, by which the mold is brought down upon the platen, its rabbeted edge 105 seating upon the raised face 104 of the platen, while the edge 106 seats upon the lower face. The parts are now in the position shown in Fig. 18, and at this instant the friction-rolls upon the arms 67 of the yoke 54 pass into a section of the cam-races indicated by the numeral $69^b$, this section being struck from the center of the shaft 29, whereby the core-box or mold shall be held immovable during the action of the plunger. Simultaneously with the entrance to the holding-sections of the cam-races, as described, the acting-face of the cam 78 engages the wear-plate 86 upon the head 80, driving the plunger 58 downward to the position shown in Fig. 19, as well as in Fig. 4, and effecting the required compression. As the wear-plates on the cam 78 pass off the wear-plate 86, a relief-surface 113 on the cam is brought over the said plate 86, thereby releasing the compressing force, the slight lift allowed to the plunger being indicated by the dotted lines in Figs. 19 and 20, respectively. At or about the same moment the rolls of the yoke 54 enter the lifting-sections $69^c$ of the cam-races and lift the core-box, the molded block being held in the meantime by the plunger, which rests thereon, but without positive pressure. During this lift of the core-box the plunger is held by the concentric face 113, which is struck from the center of the cam shaft. After the core-box or mold has risen and entirely released the molded block, the cam 78 passes off the head of the plunger, and the latter is at once lifted by the springs 98. I attach these springs, as already stated, in pairs, Fig. 4, upon each side of the head 80 and connect them to centrally-pivoted levers or yokes on the cross-brace $99^a$. The rolls of the yoke 54 now pass into concentric sections $69^d$ of the cam-races 69, and at the same moment a concentric face of the cam 78 passes upon the head 80, by which the plunger is operated, the purpose being to hold both the core-box or mold and the plunger in the position shown in Fig. 17 until a second block of plastic material can be fed upon the ensuing core-pieces of the platen-cylinder, which begins to move as soon as this is effected. As the rotary movement of the cylinder begins, the core-pieces lying within the molded block begin to gradually draw into the cylinder, owing to the eccentricity of the races 20. In order to avoid the formation of a vacuum or partial vacuum, which might partially collapse the molded block or render its removal very difficult, the ends of the core-pieces are each provided with a small spring-seated puppet-valve 115, lying in a seat formed, preferably, in an insertible plug 116, tapped into the core-block and having an opening 117, through which the stem of the valve passes, a light spring 118 being coiled thereon. These valves permit free access of air and allow the easy withdrawal of the core-pieces. It will be seen from Fig. 4 that at each successive movement of the platen-cylinder these core-pieces withdraw more and more until they are finally free from the molded block, or substantially so. The latter may be removed by hand or by automatic means and may be placed upon a carrier to be conveyed to the drying floor or kiln, where it is baked.

I have shown in Figs. 17 to 20, inclusive, the function of the small relief-opening 110 in the core-box or mold, which permits the escape of an excess of the plastic material.

As I have already set forth, I may dispense with the core-pieces and use the solid and imperforate platens shown in Fig. 8, by which I may mold a perfectly-solid block, and I do not limit the present invention to either form of construction.

What I claim is—

1. In a machine for forming paving or other blocks, the combination, with a platen-cylinder having intermittent revolution, of a core-box or mold descending upon one of the platens, a plunger moving with said core-box, but not acting upon the plastic material until after the core-box has made its engagement, a cam operating said plunger, and cam-races actuating the core-box, the cam having a relief-face, whereby the plunger is slightly raised before the core-box is drawn off the compressed mass to prevent lateral expansion of the latter, substantially as described.

2. In a machine for forming paving and other blocks, the combination, with a platen-cylinder of polygonal form having intermittent rotation and composed of a series of platens mounted on suitable supports, of a core-box or mold rising and falling at suitable intervals and forming a close joint, with a molding-table on each platen, a plunger lying in said core-box, a spring-raised piston for the plunger guided in the head carrying the core-box, means for reciprocating the latter, and a cam throwing the plunger downward, said cam having a relief-surface by which the pressure on the plunger is released during the time the core-box or mold is raised and drawn off the molded block, substantially as described.

3. In a machine for forming paving and other blocks, the combination, with a feed-platform, of a feeding-lever having a pivotal pushing-plate mounted on its lower end, a cam operating said lever, a platen-cylinder having intermittent rotation adjacent to said platform, means for imparting such rotation, a core-box or mold descending upon and inclosing a block of plastic material fed by the lever, and a plunger descending within the core-box or mold and compressing the block, the cam operating said plunger having a relief-surface concentric with the cam-shaft, whereby the pressure of the plunger is released and the molded block held while the core-box or mold is raised and withdrawn from the molded block, substantially as described.

4. In a machine for forming paving and other blocks, the combination, with a feed-platform and with a feed-lever operated by a cam, of a platen-cylinder composed of a series of platen-blocks having each one or more openings for a core block or blocks, the latter being successively projected through said openings by races eccentric to the axis of revolution and successively withdrawn into the cylinder, a core-box or mold sustained above said plastic mass when poised upon the ends of the core-pieces, means for locking the platen-cylinder at suitable points, duplex cam-races which receive rolls on a yoke by which the core-box or mold is dropped to inclose the plastic block, said cam-races having concentric sections which hold the core-box in place on the platen, and a plunger descending within the core-box and driven by a cam having a relief-face by which the compressing force of the plunger is released, and provided with a holding-face maintaining such position while the core-box is withdrawn from the formed blocks, substantially as described.

5. In a machine for forming paving and other blocks, the combination, with a platen-cylinder composed of a series of platens, of a series of core-pieces radially projecting through openings in said platens, and provided with shafts having rolls running in circular cam-races eccentric to the axis of revolution, of a core-box or mold inclosing a plastic mass resting on the projected ends of the core-pieces and a plunger effecting the compression, the core-pieces being provided with relief-valves in their ends to permit withdrawal from the block after compression without forming an interior vacuum, substantially as described.

6. In a machine for forming paving and other blocks, the combination, with a platen-cylinder having intermittent revolution and composed of a series of platens having raised platforms, of a rising and falling core-box or mold having a rabbeted edge descending upon the edges of the raised platform and an angular edge engaging the surface below, a cam-actuated plunger descending within said box or mold, the cam having a relief-surface, and gears having cam-races consisting of forcing-sections, holding-sections, withdrawing-sections, and sustaining-sections, substantially as described.

7. In a machine for forming paving and other blocks, the combination, with a platen-cylinder composed of plates arranged in substantially polygonal form, of one or more core blocks or pieces radially projecting through openings in said plates and sustained by shafts having rolls which run in races eccentric to the axis of revolution, angular guides arranged between the core-pieces and forming part of the rigid revolving frame carrying the core-pieces, a reciprocating pitman carrying a pawl by which a step-by-step movement is imparted to the cylinder, and a locking-rod engaging notches in a disk on the shaft of the cylinder, a friction-brake being applied to one end of said shaft, substantially as described.

8. In a machine for forming paving or other blocks from plastic material, the combination, with a core-box or mold inclosing said block and carried by a reciprocating head having guidance upon standards of the machine, of a plunger carried by a piston passing through the reciprocating head and a rotating platen-cylinder having radially-movable core pieces or blocks, substantially as described.

9. In a machine for forming paving and other blocks from plastic material, the combination, with an intermittently-rotating platen-cylinder, of a core-box rising and falling from and toward the platens as they are successively presented and a plunger lying within said core-box and having a consecutive action with relation thereto, said plunger being provided with removable or interchangeable acting-faces, and the core-box or mold being provided with a removable section of its wall to permit the removal of one and the substitution of another and different face-plate without dismantling the machine, substantially as described.

10. In a machine for forming paving and other blocks, the combination, with an intermittently-revolving platen-cylinder, of core-pieces revolving with the cylinder but carried by supports running in an eccentric circular race, a core-box or mold within which the core-pieces are inclosed with the plastic material poised thereon, a compressing-plunger, a cam actuating the same, and means for releasing the pressure of said cam and holding the same while the core-box is drawn off the molded block, substantially as described.

11. In a machine for molding paving and other blocks, the combination, with a reciprocating core-box or mold, of a compressing-plunger moving in the core-box or mold radially, core-pieces entering or inclosed by said mold, which is provided with relief-openings, and valves in the ends of the core-pieces to permit their withdrawal, substantially as described.

12. In a machine for forming paving and other blocks, the combination with a series of intermitting advancing platens, of a core-box or mold engaging each platen successively and inclosing the plastic mass, a plunger compressing the same, a spring-raised cam actuating said plunger, and cam-races operating the core-box or mold, the said cam-races having forcing-sections, holding-sections, raising-sections, and sustaining-sections, and the cam having a sustaining-face concentric with the sustaining-sections of the cam-races, substantially as described.

In testimony whereof I have affixed my signature in presence of two witnesses.

WILLIAM B. HAYDEN.

Witnesses:
HENRY C. NOBLE,
HENRY M. BUTLER.